United States Patent [19]

Rohr

[11] Patent Number: 5,450,984
[45] Date of Patent: Sep. 19, 1995

[54] MATERIAL FEEDING APPARATUS
[75] Inventor: Marcel O. Rohr, Haddonfield, N.J.
[73] Assignee: K-Tron Technologies, Inc., Wilmington, Del.
[21] Appl. No.: 236,539
[22] Filed: Apr. 29, 1994
[51] Int. Cl.6 .............................................. B67D 5/08
[52] U.S. Cl. ....................................... 222/56; 222/64; 222/77; 222/129
[58] Field of Search ....................... 222/53, 56, 63, 64, 222/65, 77, 71, 144.5, 145, 129, 413; 364/567, 479; 425/105, 50; 414/294, 21

[56] References Cited

U.S. PATENT DOCUMENTS

| | | | |
|---|---|---|---|
| 2,638,248 | 5/1953 | Alvord | 222/56 |
| 3,198,386 | 8/1965 | Hartley | 222/56 X |
| 3,225,963 | 12/1965 | Arpajian | 222/56 X |
| 3,804,298 | 4/1974 | Ricciardi | 222/56 |
| 4,378,897 | 4/1983 | Kattelmann | 222/63 X |
| 4,498,783 | 2/1985 | Rudolph | 222/56 X |
| 4,767,258 | 8/1988 | Solvi et al. | 222/56 X |
| 4,793,512 | 12/1988 | Krauss | 222/77 X |
| 4,867,343 | 9/1989 | Ricciardi et al. | 222/56 X |
| 4,983,090 | 1/1991 | Lehmann et al. | |
| 5,103,401 | 4/1992 | Johnson | 222/56 X |
| 5,148,943 | 9/1992 | Moller | 222/56 X |

Primary Examiner—Andres Kashnikow
Assistant Examiner—Kenneth R. DeRosa
Attorney, Agent, or Firm—Ratner & Prestia

[57] ABSTRACT

Material feeding apparatus having, as one aspect, combining the loading, feeding and refilling functions in a single, vertically disposed housing with a feeder hopper portion of the housing below a refill hopper portion of the housing and separated from the refill hopper portion by a divider wall. The passage of material from the refill hopper portion to the feeder hopper portion is through a valve and material is drawn into the refill hopper portion by a vacuum source and discharged to the feeder hopper portion in response to indications of the level of the material in the refill hopper portion and the feeder hopper portion. A second aspect of this material feeding apparatus is the use of a flap valve as the valve which determines the passage of material from the refill hopper to the feeder hopper. A third aspect of this material feeding apparatus is combining two or more such systems in a blender and loading the systems with a single vacuum source which is selectively indexed to load the individual systems with constituent parts of a blend as the demand for material is sensed.

37 Claims, 7 Drawing Sheets

MATERIAL FEEDING APPARATUS

BACKGROUND OF THE INVENTION

The present invention relates, in general, to materials handling and, in particular, to feeding apparatus which delivers controlled amounts of materials to utilization apparatus.

Figure 1:
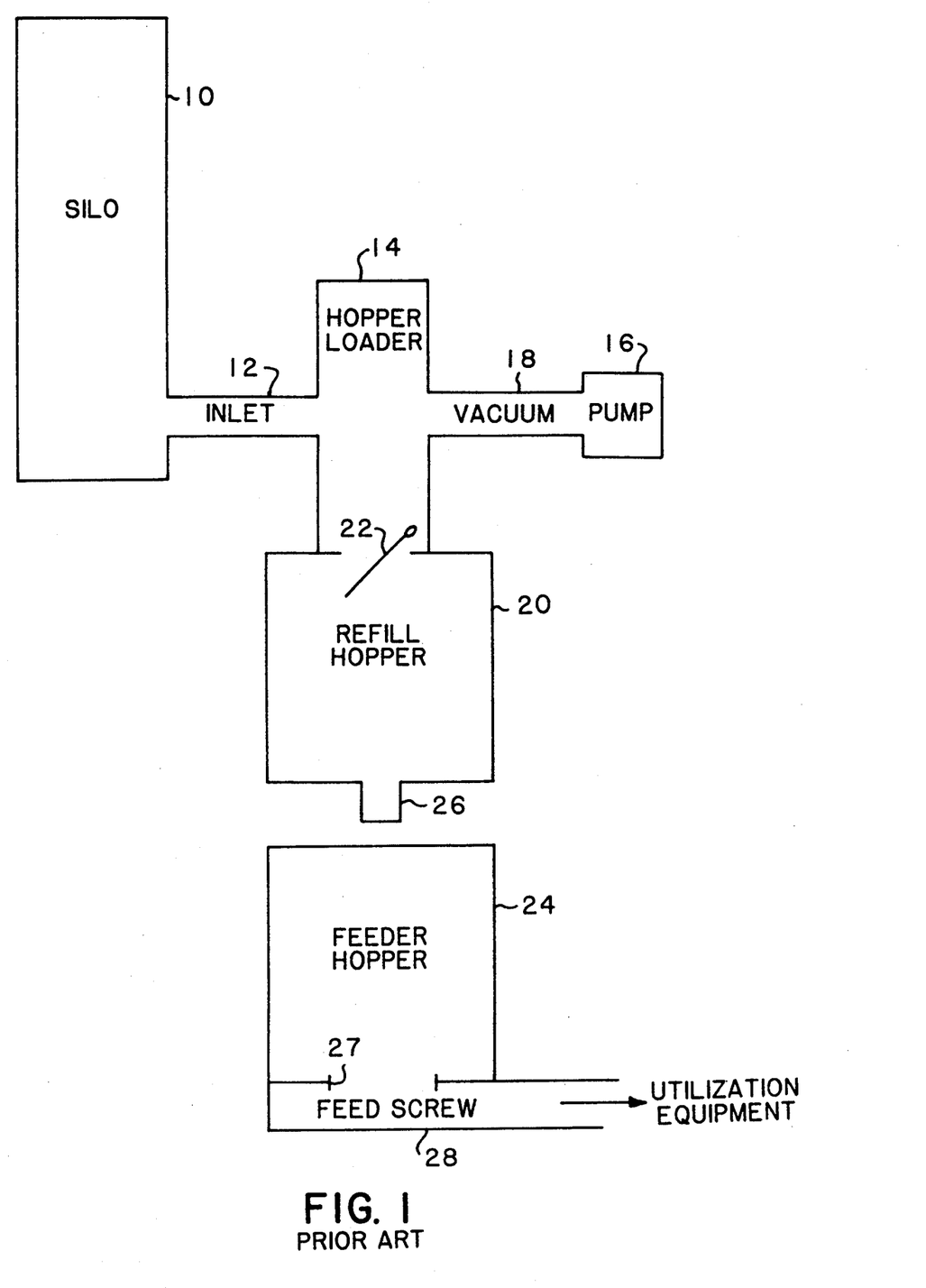
FIG. 1 is a schematic vertical section view of a typical prior art feeding system.

FIG. 1 is a schematic drawing of a typical prior art feeding system of the type to which the present invention relates. Material, for example, in the form of pellets is drawn from a silo 10 through an inlet tube 12 to a loader 14, such as the hopper which is shown in FIG. 1 or onto a conveyor, by a vacuum pump 16 acting through a vacuum tube 18. Hopper loader 14 discharges controlled amounts of the material to a refill hopper 20, below the hopper loader, through a flap valve 22. The material in refill hopper 20, in turn, is discharged to a feeder hopper 24, positioned below the refill hopper, through an outlet valve 26 at the bottom of the refill hopper. The material in feeder hopper 24, in turn, is supplied through an opening 27 at the bottom of the refill hopper to a feed unit 28, in this example a feed screw unit, which is positioned below the feeder hopper and, in turn, delivers controlled amounts of the material to utilization apparatus (not shown). The utilization apparatus can be, for example, extrusion equipment.

Not shown in FIG. 1 are the means by which the various components of the feeding system are controlled to transfer proper amounts of the material at the proper times. Flap valve 22 is controlled by the level of material in refill hopper 20. Flap valve 22 remains open, after material is discharged from hopper loader 14, while material remains in the hopper loader and closes when outlet valve 26 is opened. Outlet valve 26 is controlled by the level of material in feeder hopper 24. Vacuum pump 16 is controlled by flap valve 22 and serves to draw material from silo 10 through inlet tube 12 to hopper loader 14.

A typical application of the feeding system shown in FIG. 1 is in a blender where two or more such systems are combined to deliver controlled amounts of two or more constituent parts of a blend to a collection hopper which, in turn, delivers the blend to utilization apparatus. In such an application, the feed unit, in this example a feed screw unit, of each feeding system is operated both in a "gravimetric" mode and in a "volumetric" mode. In the gravimetric mode, the speed of the feed screw unit of the feeding system is controlled by weight changes in the feeder hopper caused by changes in the amount of the material in the feeder hopper, so that, over time, a varying amount of material is delivered by the feed screw unit to the collection hopper. In the volumetric mode, the speed of the feed screw unit is held constant, so that, over time, a constant amount of material is delivered by the feed screw unit to the collection hopper. Each feeding system is operated in the gravimetric mode, except during the times that the feeder hopper is being loaded with material from the refill hopper, at which times the feeding system is operated in the volumetric mode. Thus, material is delivered to the collection hopper by the feed screw unit even while the feeder hopper is being loaded, but at a constant rate, rather than at a varying rate, because the speed of the feed screw unit is held fixed. A typical time division, over a one minute full cycle, between operation in the gravimetric mode and operation in the volumetric mode, for a feeding system having, for example, a twenty liter hopper loader, a fifty liter refill hopper, and a fifty liter feeder hopper, is forty seconds of operation in the gravimetric mode and twenty seconds of operation in the volumetric mode.

Feeding systems of the type shown in FIG. 1 have certain shortcomings. By using three distinct and separate containers for the material (i.e. hopper loader 14, refill hopper 20, and feeder hopper 24) in the system for delivery of material from silo 10 to feed screw unit 28, the overall height of the apparatus is undesirably large. In addition, the controls for effecting proper delivery of material from one container to another, in terms of both the amount of material and the timing of the delivery, involve more components and complexity than are desired.

When two or more such systems are combined in a blender application, it is common practice to use a single vacuum system to fill the hopper loaders. The vacuum system is switched between the feeding systems in a predetermined sequence to deliver the constituent parts of the blend to the individual hopper loaders. Such operation limits the flexibility of the blender unless the hopper loaders are sized to accommodate the delivery of material when, in fact, material is not required. Additionally, if access to the vacuum source is provided to the feeders in a fixed sequence, a feeder having a high mass feed rate could potentially become empty before it obtains access to the vacuum source. Of course, an alternative is to have two or more separately controlled vacuum systems, for example one for each feeding system, which respond more closely to the individual demands for material of the individual feeding systems. However, such vacuum systems are expensive.

SUMMARY OF THE INVENTION

Material feeding apparatus for delivering material from a storage container to utilization equipment, constructed in accordance with a first aspect of the present invention, includes a vertically disposed housing having a divider wall extending across the housing to define a feeder hopper portion below the divider wall and a refill hopper portion above the divider wall. The housing has an outlet at the bottom of the feeder hopper portion of the housing. This material feeding apparatus also has a vacuum source for drawing material from the storage container to the refill hopper portion of the housing and a valve in the divider wall of the housing and which is movable between a completely closed position at which material in the refill hopper portion of the housing is prevented from discharging into the feeder hopper portion of the housing and an open position at which material in the refill hopper portion of the housing is permitted to discharge into the feeder hopper portion of the housing. The material feeding apparatus also has a feed unit positioned below the outlet at the bottom of the feeder hopper portion of the housing for delivering material to the utilization equipment and sensing means for (1) indicating when the level of material in the refill hopper portion of the housing is at least as high as a first prescribed level, (2) indicating when the level of material in the feeder hopper portion of the housing is at least as low as a second prescribed level, and (3) sensing the weight of the material in the housing. The material feeding apparatus also has control means for (1) maintaining the vacuum source deactuated, (2) maintaining the vacuum source actuated, and (3) controlling the speed of the feed unit. The control means have, as inputs, signals from the sensing means and, as outputs, signals to the vacuum source and feed unit. The vacuum source is maintained deactuated when the level of material in the refill hopper portion of the housing is at least as high as the first prescribed level and the level of material in the feeder hopper portion of the housing is above the second prescribed level. The vacuum source is maintained actuated when the level of material in the refill hopper portion of the housing is below the first prescribed level and the level of material in the feeder hopper portion of the housing is at least as low as the second prescribed level. The speed of the feed unit is controlled (1) to vary the speed of the feed unit in response to the weight of the material in the housing while the level of material in the feeder hopper portion of the housing is above the second prescribed level, and (2) to maintain the speed of the feed unit constant while the level of material in the refill hopper portion of the housing is below the first prescribed level and the level of material in the feeder hopper portion of the housing is at least as low as the second prescribed level.

In accordance with a second aspect of the present invention, the position of a flap valve which is disposed between a refill hopper a feeder hopper determines whether or not material discharges from the refill hopper to the feeder hopper. This flap valve moves from an open position to a completely closed position when the level of the material in the feeder hopper is at least as low as a prescribed level and the flap valve is held in the closed position by the vacuum developed by the vacuum source,. A sensor which is responsive to the level of material in the feeder hopper functions to control operation of the vacuum source. In one embodiment of the present invention, this sensor serves only to indicate whether the flap valve is open or completely closed. In another embodiment, this sensor, in combination with the flap valve, provide a direct indication of the level of material in the feeder hopper. In a third embodiment, this sensor alone provides a direct indication of the level of material in the feeder hopper.

In accordance with a third aspect of the present invention, when two or more such feeding systems are arranged in a blender application and a single vacuum system is used to load the individual feeding systems, the vacuum system is selectively indexed between the feeding systems on the basis of demand for material.

DETAILED DESCRIPTION OF THE INVENTION

Figure 2:
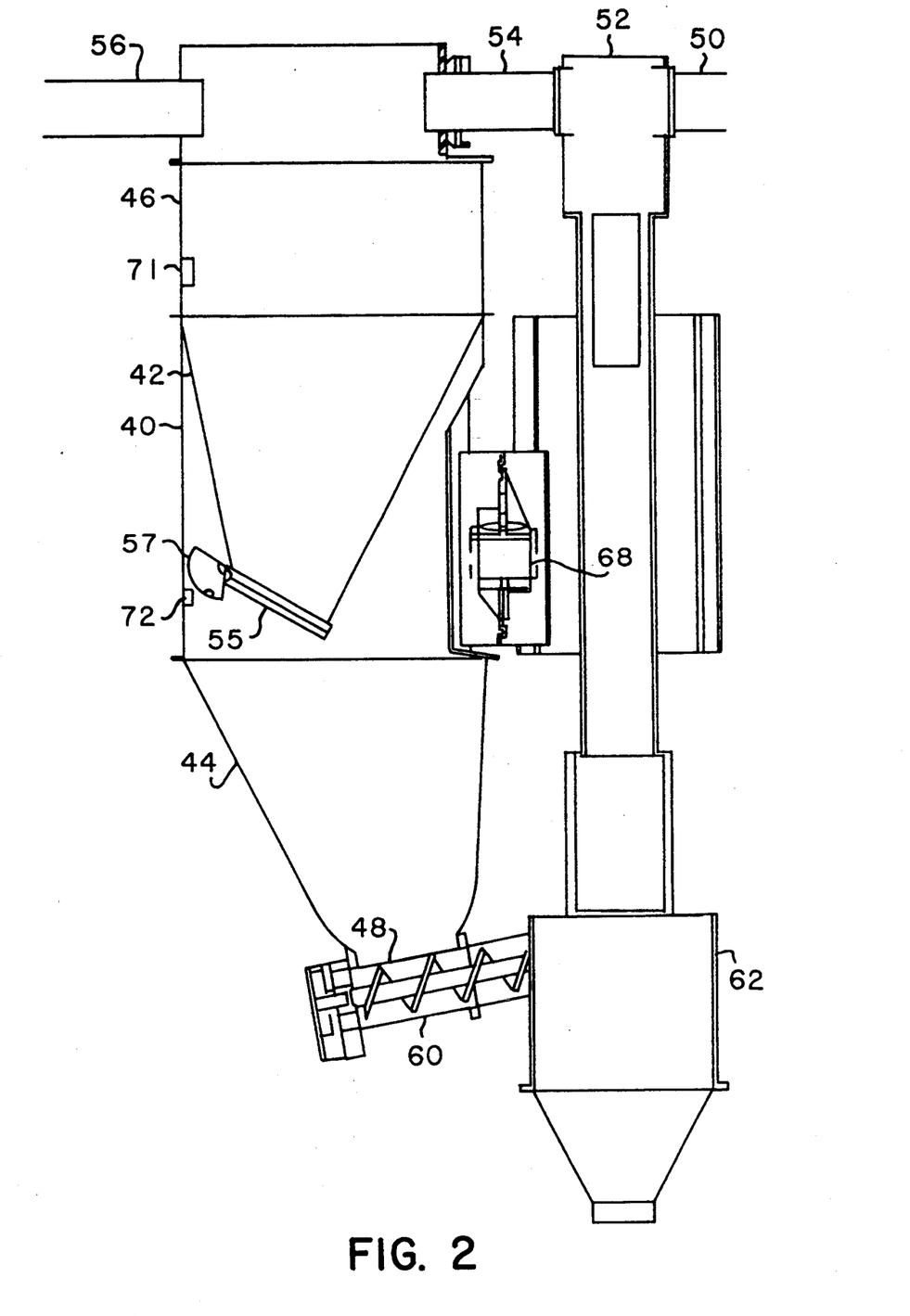
FIG. 2 is a schematic vertical section view of material feeding apparatus constructed in accordance with the present invention.

Referring to FIG. 2, material feeding apparatus for delivering material from a storage container to utilization apparatus, constructed in accordance with the present invention, includes a vertically disposed housing 40 having a divider wall 42 extending across the housing to define a feeder hopper portion 44 below the divider wall and a refill hopper portion 46 above the divider wall. Housing 40 has an outlet 48 at the bottom of feeder hopper portion 44 of the housing. Divider wall 42 preferably is of generally conical shape with the point end of the cone downward. Likewise, feeder hopper portion 44 of housing 40 is of generally conical shape with the point end of the cone downward.

The FIG. 2 material feeding apparatus also has a vacuum source for drawing material from the storage container (not shown) to refill hopper portion 46 of housing 40. This vacuum source is represented by a vacuum tube 50 connected to a vacuum pump (not shown) of conventional construction and operation, a pneumatic junction 52 and a second vacuum tube 54 connected between the pneumatic junction and refill hopper portion 46 of housing 40. When actuated, the vacuum source is effective in holding a flap valve 55 closed and drawing material from the storage container (not shown) through an inlet tube 56 to refill hopper portion 46 of housing 40. The inclusion of pneumatic junction 52 and second vacuum tube 54, rather than vacuum tube 50 being connected directly to refill hopper portion 46 of housing 40, is because the material feeding apparatus shown in FIG. 2 is adapted for use in a material blender system. This will be explained in greater detail in connection with FIG. 3.

Flap valve 55 of the FIG. 2 material feeding apparatus is located in divider wall 42 of housing 40 at the bottom of refill hopper portion 46 of the housing. This flap valve is pivotally mounted for movement from and to a completely closed position, shown in FIG. 2, at which material in refill hopper portion 46 of housing 40 is prevented from discharging into feeder hopper portion 44 of the housing and over a range of open positions at which material in the refill hopper portion of the housing is permitted to discharge into the feeder hopper portion of housing.

At its completely open position, flap valve 55 extends into feeder hopper portion 44 of housing 40 and is prevented from returning to its closed position by material in the feeder hopper portion while the level of this material is above the free edge of the flap valve. When the level of the material in feeder hopper portion 44 of housing 40 drops, as it is discharged through outlet 48, to a point at which the free edge of flap valve 55 is clear of material, the flap valve can move upward and return to its completely closed position. A return element, such as a spring or counter-weight and which is represented by reference numeral 57, is provided to urge flap valve 55 upward to its completely closed position. So long as the vacuum source is actuated, flap valve 55, responsive to the vacuum, remains closed. When the vacuum source is deactuated, flap valve 55 is no longer held closed by the vacuum source, so that the weight of the material in refill hopper portion 46 of housing 40 causes the flap valve to move downward and open against the effect of return element 57. The generally conical shape of refill hopper portion 46 of housing 40 causes material to collect above flap valve 55, located at the bottom of the refill hopper portion of the housing, when the flap valve is completely closed and to funnel material through the flap valve to feeder hopper portion 44 of the housing when the flap valve is within its range of movement and open. Although other types of valves can be used in the discharge of material from a refill hopper to a feeder hopper, a flap valve of the type illustrated in FIG. 2 is particularly advantageous in implementing the concept of controlling the discharge of material from the refill hopper to the feeder hopper in accordance with the present invention.

The FIG. 2 material feeding apparatus also has a feed unit 60, in the form of a feed screw unit, positioned below outlet 48 at the bottom of feeder hopper portion 44 of housing 40 for delivering material to the utilization apparatus. For the application of the material feeding apparatus shown in FIG. 2, the utilization apparatus is a collection hopper 62 to which constituent parts of a blend are delivered by one or more other feed units and from which the blended material can be delivered to other apparatus (not shown), such as extrusion equipment. The generally conical shape of feeder hopper portion 44 of housing 40 causes material to collect at outlet 48 at the bottom of the feeder hopper portion of the housing and to be discharged through outlet 48 to feed screw unit 60.

The FIG. 2 material feeding apparatus also has sensing means for indicating: (1) when the level of material in refill hopper portion 46 of housing 40 is at least as high as a first prescribed level, (2) when the level of material in feeder hopper portion 44 of housing 40 is at least as low as a second prescribed level, and (3) the weight of the material in housing 40. FIG. 2 illustrates two embodiments of such sensing means.

In a first arrangement of the sensing means, three load cells 68 of conventional construction and operation (only one of which is shown in FIG. 2) are arranged in the usual manner, namely 120 degrees apart. In a manner to be described hereinafter, the output signals from load cells 68 are used to indicate when the level of material in refill hopper portion 46 of housing 40 is at least as high as the first prescribed level and when the level of material in feeder hopper portion 44 of housing 40 is at least as low as the second prescribed level.

The FIG. 2 material feeding apparatus also has control means for deactuating and actuating the vacuum source and controlling the speed of feed unit 60. The control means are represented by block 70 in FIG. 4 to which load cells 68 are connected, so that signals from load cells 68 are inputs to the control means. The output signals from block 70 control operation of the vacuum source (i.e. the vacuum pump which is not shown) and feed unit 60.

For a particular material being handled by the FIG. 2 material feeding apparatus, a first total weight value, corresponding to the weight of housing 40 when the level of material in refill hopper portion 46 of the housing is at least as high as the first prescribed level, and a second total weight value, corresponding to the weight of the housing when the level of material in feeder hopper portion 44 of the housing is at least as low as the second prescribed level, are predetermined and stored in control block 70. By suitable design of block 70, the outputs of load cells 68, indicative of the total weight of housing 40 when the level of material in refill hopper portion 46 of the housing is at least as high as the first prescribed level and the total weight of the housing when the level of material in feeder hopper portion 44 of the housing is at least as low as the second prescribed level, are compared with the predetermined and stored first and second total weights values, respectively, and the vacuum source can be deactuated when the first total weight of housing 40 corresponds to the prescribed refill level of refill hopper portion 46 of the housing (i.e. the first prescribed level) and the vacuum source can be actuated when the second total weight of the housing corresponds to the prescribed discharge level of feeder hopper portion 44 of the housing (i.e. the second prescribed level). For safety purposes to prevent overfilling of refill hopper portion 46 of housing 40, a level sensor 71 can be positioned at the highest level possible in the refill hopper portion of the housing. Level sensor 71 can take a variety of forms which are known to those skilled in the art for sensing the level of material in various parts of feeder systems.

The vacuum source is maintained deactuated in response to load cells 68 when the level of material in refill hopper 46 portion of housing 40 is at least as high as the first prescribed level and while flap valve 55 is open. The vacuum source should not cause filling of refill hopper portion 46 while material is being discharged through flap valve 55 to feeder hopper portion 44 and when the level of material in the refill hopper portion is sufficient.

The vacuum source is maintained actuated in response to load cells 68 when the level of material in refill hopper portion 46 of housing 40 is below the first prescribed level and while flap valve 55 is closed. The vacuum source should cause filling of refill hopper portion 46 while material is prevented from being discharged through flap valve 55 to feeder hopper portion 44 and when the level of material in the refill hopper portion is insufficient.

In an alternative arrangement of the sensing means, three separate sensing means are provided. The first sensing means include level sensor 71 which can be positioned to indicate when the level of material in refill hopper portion 46 of housing 40 is at least as high as the first prescribed level.

The second sensing means include a sensor 72 which, either alone or in combination with flap valve 55, can indicate when the level of material in feeder hopper portion 44 of housing 40 is at least as low as the second prescribed level. By suitable sizing of flap valve 55 and selecting the range of movement of the flap valve such that the flap valve is free to move from the open position of the flap valve to the completely closed position of the flap valve when the level of material in feeder hopper 44 of housing 40 is at least as low as the second prescribed level of material, the flap valve and sensor 72 provide an indication when the level of material in the feeder hopper portion of the housing is at least as low as the second prescribed level. Sensor 72, responsive to the movement of flap valve 55, provides a signal indicative of the closed position of flap valve 55 to actuate the vacuum source. Sensor 72 can take a variety of forms, such as a simple mechanical switch which is open when flap valve 55 is open and is closed when the flap valve is closed. As an alternative, sensor 72 can be positioned in feeder hopper portion 44 of housing 40 at a height corresponding to the second prescribed level. When flap valve 55 has returned to its closed position and sensor 72 senses that the level of material in feeder hopper portion 44 of housing 40 is at least as low as the second prescribed level, the sensor causes the vacuum source is to be actuated to discharge material from refill hopper portion 44 of the housing to the feeder hopper portion of the housing. In this case, sensor 72 can take a variety of forms which are known to those skilled in the art for sensing the level of material in various parts of feeder systems.

The third sensing means include load cells 68 which indicate the weight of the material in housing 40.

Figure 4:
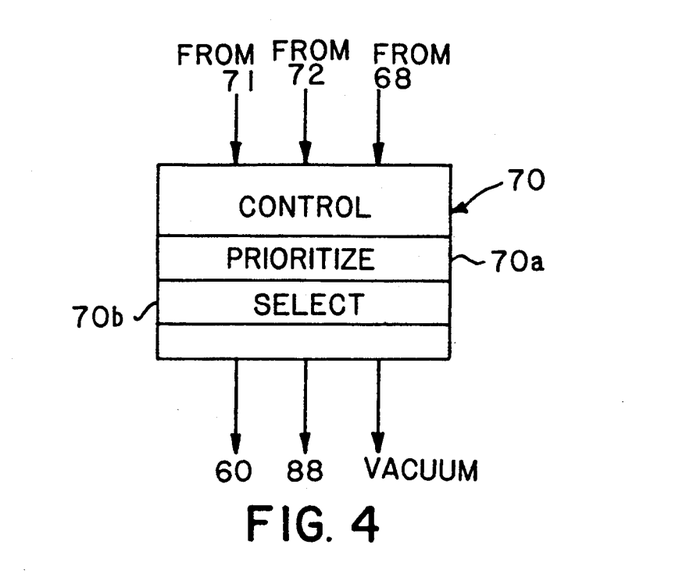
FIG. 4 represents the control block of material feeding apparatus and a blender constructed in accordance with the present invention.

With three separate sensing means, there are three inputs to control block 70. The vacuum source is maintained deactuated in response to level sensor 71 when the level of material in refill hopper 46 portion of housing 40 is at least as high as the first prescribed level and sensor 72 while flap valve 55 is open or the level of material in feeder hopper portion 44 of the housing is at least as low as the second prescribed level. The vacuum source is maintained actuated in response to level sensor 71 when the level of material in refill hopper portion 46 of housing 40 is below the first prescribed level and sensor 72 when flap valve 55 is closed or the level of material in feeder hopper portion 44 of the housing is above the second prescribed level. The speed of feed unit 60 is controlled to vary the speed of the feed unit (i.e. gravimetric mode) in response to weight measurements developed by load cells 68 and sensor 72 while flap valve 58 is closed or the level of material in feeder hopper portion 44 of housing 40 is above the second prescribed level. The speed of feed unit 60 is controlled to maintain the speed of the feed unit constant (i.e. volumetric mode) in response to sensor 71 while the level of material in refill hopper portion 46 of housing 40 is below the first prescribed level and sensor 72 while the flap valve is open or the level of material in feeder hopper portion 44 of the housing is above the second prescribed level.

Block 70 can be either a hard-wired circuit or a unit controlled by software. Given the inputs to block 70, namely signals only from load cells 68 or from level sensor 71, sensor 72, and load cells 68 and the desired control of the vacuum source and feed unit 60, block 70 can be arranged by applying conventional design practices.

Figure 3:
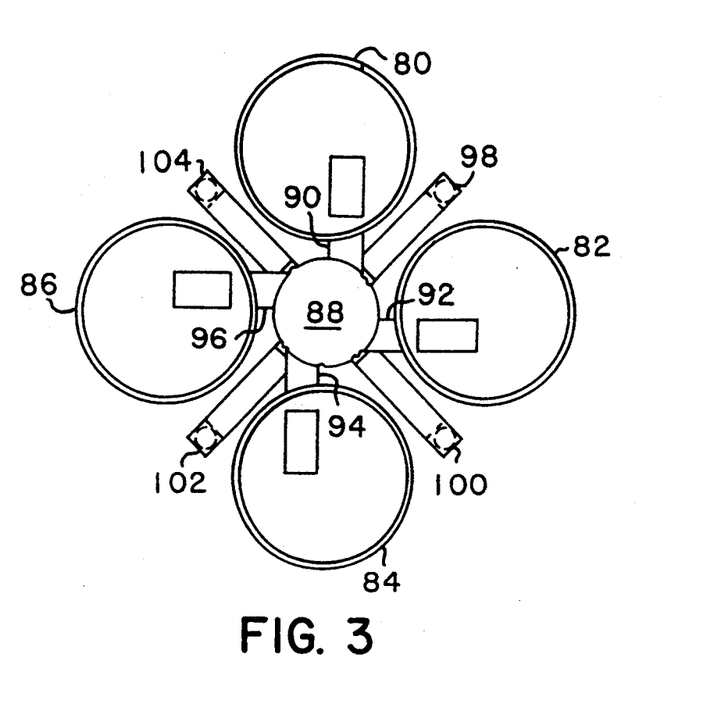
FIG. 3 is a horizontal section view of a blender constructed in accordance with the present invention.

FIG. 3 is a horizontal section view of a blender composed of four material feeders 80, 82, 84 and 86 constructed in accordance with the present invention. The refill hopper portions of the housings of material feeders 80, 82, 84 and 86 are connected to a pneumatic junction, in the form of a pneumatic switch 88, by a plurality of vacuum tubes 90, 92, 94 and 96, respectively. Pneumatic switch 88 is indexed to selectively apply a vacuum to the refill hopper portions of the housings of the material feeders 80, 82, 84 and 86 through vacuum tubes 90, 92, 94 and 96, respectively, to selectively draw material from a plurality of storage containers (not shown) individually associated with the material feeders. In this way, the vacuum source is effectively applied to (i.e. actuated) and removed from (i.e. deactuated) the refill hopper portions of the housings of the individual material feeders. The control for indexing pneumatic switch 88 is shown as another output of block 70 of FIG. 4. This control can be arranged for applying the vacuum source to the respective refill hopper portions of the housings in consecutive order or selectively as the demand for delivery of more material to any of the refill hopper portions of the housings is indicated by analysis of the outputs of the sensors associated with the refill hopper portions of the housings of the individual material feeders. Again, the control for applying the vacuum source to the respective refill hopper portions of the housing can be effected by applying conventional design practices.

Also included in the blender of FIG. 3 are a plurality of feed screw units 98, 100, 102 and 104 individually associated with the material feeders 80, 82, 84 and 86, respectively. Feed screw units 98, 100, 102 and 104 deliver constituent materials to a collector hopper where the blend is formed.

According to another aspect of the invention, the control means (block 70) may include prioritizing means 70a for dynamically determining which one of the material feeders 80, 82, 84 or 86 first becomes empty if not refilled (i.e., which feeder is temporally closest to becoming empty). Block 70 includes a function 70b for selecting the feeder so determined to be the next feeder coupled to the vacuum source by the switching means 88.

Conceptually, the prioritizing means computes the amount of time each feeder 80, 82, 84 and 86 can continue to deliver material at its current mass flow rate before becoming empty. The feeder having the shortest amount of time remaining is refilled next.

In the exemplary embodiment, the amount of time remaining before each individual feeder becomes empty is estimated by calculating and updating a computationally simple priority product value. The prioritizing means dynamically assigns a different priority product value to each of the material feeders 80, 82, 84 and 86. The priority product value is defined so that, as the amount of time remaining before a feeder becomes empty grows shorter, the priority product value of that feeder becomes greater. Exemplary block 70 also includes selecting means 70b for selecting the material feeder 80, 82, 84 or 86 having the highest priority product value. The respective refill hopper portion 46 of the selected material feeder 80, 82, 84 or 86 is coupled to the vacuum source next by the switching means 88 for refilling that refill hopper portion. The prioritizing means 70a thus permits a single vacuum source to be shared by feeders 80, 82, 84 and 86 without allowing any of the feeders to become empty.

The priority product value is the product of two factors. The first factor is the feeder priority. The feeder priority is a measure of the time it takes for the material in the feeder to fall from the first prescribed level to the second prescribed level, based on the current mass flow rate of the feeder. In the exemplary embodiment, the refill priority is the reciprocal of that time, so that a shorter time between first and second prescribed levels results in a higher refill priority. Thus, the refill priority represents the expected number of times that the refill hopper 46 of that material feeder 80, 82, 84 or 86 is refilled within a prescribed unit of time (e.g., refills/hour). Each material feeder 80, 82, 84 and 86 may have a respectively different feeder priority.

The feeder priority is dynamically adjusted as a function of the setpoint of the utilization equipment (e.g., extruder). If the utilization equipment setpoint changes, the feeder priority (i.e., number of refills per unit of time) of each material feeder 80, 82, 84 and 86 is automatically adjusted to meet the demand of the utilization equipment.

Figure 5:
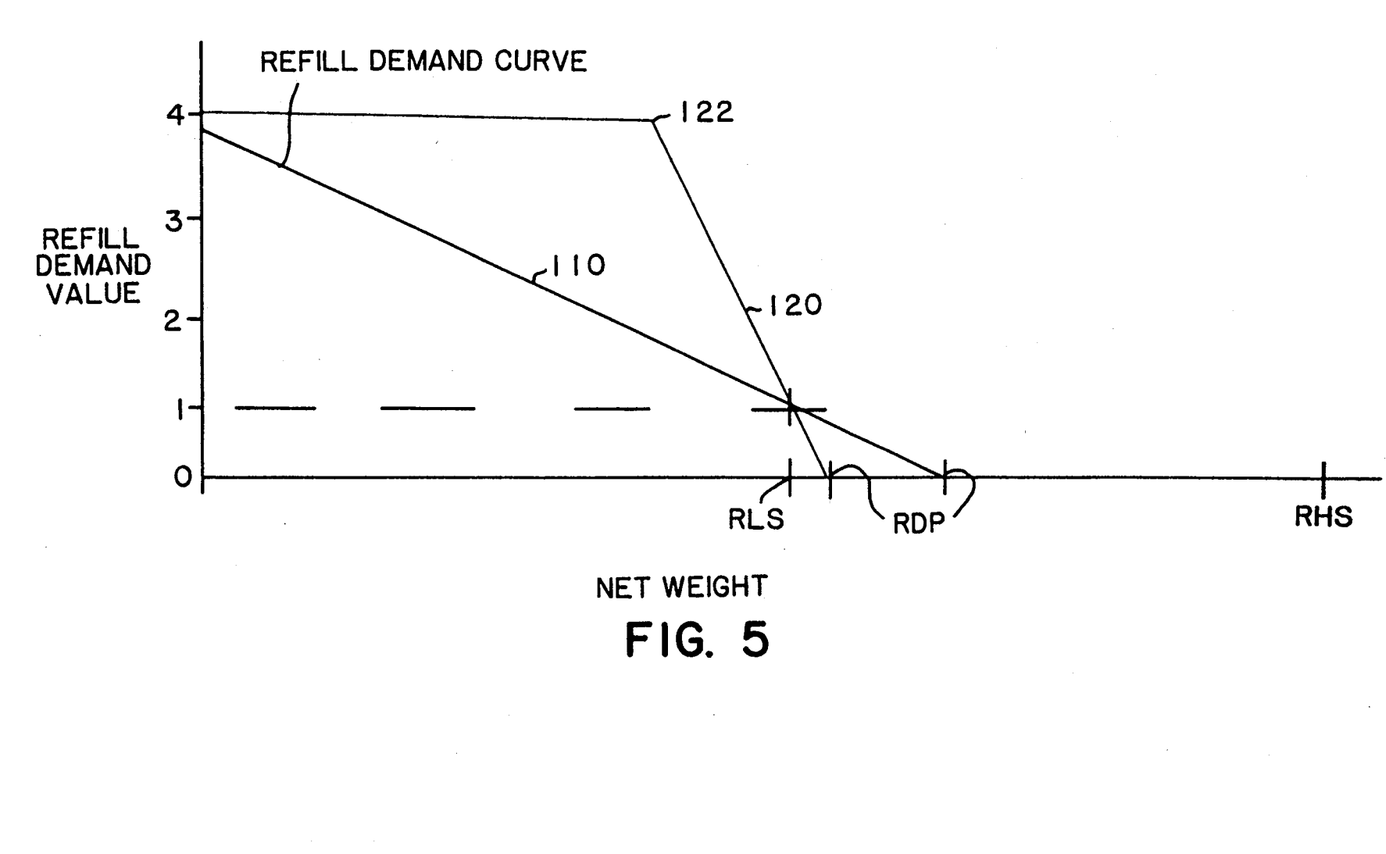
FIG. 5 is a diagram showing an exemplary Refill Demand Value function used in the control block shown in FIG. 4.

The second factor used to determine the priority product value is a dynamically adjusted Refill Demand Value (RDV). In the exemplary embodiment, the RDV is determined from an empirically determined function of the net weight of material in that feeder. Each material feeder may have a respectively different RDV function. Exemplary RDV function 110 for a high priority material feeder (e.g., feeder 80) is shown in FIG. 5. A second exemplary RDV function 120 is typical of a low priority feeder (e.g., feeder 84). RDV function 110 decreases linearly as the net weight of material in the corresponding material feeder 80 increases.

Weight sensors such as load cells 68 provide continuous measurement of the quantity of material in feeders 80, 82, 84 and 86. The weight measurement may be used to continuously determine the current Refill Demand Value of a feeder, as a measure of how soon the feeder will need to be refilled. It is understood by one skilled in the art that level sensors could be used. However, several level sensors would be needed to measure the amount of material in refill hopper portion 46 and feeder hopper portion 44 throughout the range of material levels, and the measure provided by the level sensors typically is less accurate than weight measurements.

The exemplary RDV functions 110 and 120 of FIG. 5 have a maximum value of 4. Each RDV function 110 is further defined by the net weight of the material in feeder 80 when the material in the feeder hopper portion 44 is at the second prescribed level. This is the weight (designated Refill Low Setting, or RLS in FIG. 5) at which the vacuum source is actuated and the refill hopper portion 46 of the material feeder 80 is refilled by causing the switching means 88 to couple the refill hopper portion 46 to the vacuum source and apply the vacuum to draw material into that refill hopper portion 46 from the material source. The RDV functions 110 and 120 are defined to have a value of "1" when the net weight is equal to the RLS weight.

RDV functions 110 and 120 are also defined by "X-intercept" points (designated RDP in FIG. 5), at which the value of RDV functions 110 and 120 are equal to zero. The RDP point is the point at which the net weight of the material in the material feeder is equal to the sum of the RLS weight plus the average amount of material fed by the feed screw unit 98, 100 of the corresponding material feeders 80, 84 while the refill hopper portions 46 of the material feeders are being refilled. For this purpose, the duration of the refill is the time between actuation of the vacuum source after the material reaches the second prescribed level and subsequent deactivation of the vacuum source after the material reaches the first prescribed level.

Generally, feeders having higher priority (number of refills per unit of time) have a greater RDP value than equally sized feeders having lower priority. One purpose of the prioritizing means 70a is to refill the feeders in a sequence that maintains the net weight of each material feeder 80, 82, 84 and 86 at a value greater than (to the right of) the RLS value when possible. The net weight of material in a low priority feeder 84 is permitted to fall closer to the RLS weight than is a high priority feeder 80 before its RDV value becomes greater than zero.

In the exemplary RDV function 110, the RDV is less than 4 throughout the range of the function. The RDV function 120 for a low priority feeder 84 rapidly rises towards a maximum value of 4 as the net weight decreases below the RLS weight. Once the RDV function reaches 4, it retains that value for all net weights below the knee 122 of curve 120.

Table 1 shows an example of the information used to determine the priority product (RDV * Priority) values for the material feeders 80, 82, 84 and 86 shown in FIG. 3. The RDV functions for feeders 80 and 84, if plotted, appear as shown in FIG. 5.

TABLE 1

| Feeder | 80 | 82 | 84 | 86 |
|---|---|---|---|---|
| feed rate (kg./hr.) | 450 | 75 | 20 | 10 |
| Current Net Weight | 15 | 15 | 14 | 14 |
| RLS weight | 14 | 14 | 14 | 12 |
| Refills/Hr. (Priority) | 28 | 5.4 | 1.5 | 1.0 |
| refill duration (sec.) | 32 | 30 | 29 | 24 |
| RDP weight | 18 | 14.625 | 14.16 | 12.06 |
| current RDV value | .75 | 0 | 1.0 | 0 |
| RDV * Priority | 21 | 0 | 1.5 | 0 |

The general rule followed by the selecting means 70b is that a refill cycle for a feeder 80, 82, 84 or 86 starts when the net weight of material in the feeder is at or below the RLS weight (i.e., the second prescribed value), as long as no other feeder currently has a higher priority product value (RDV * priority). If the weight of material in every feeder is greater than the RLS weight, the vacuum source may be deactuated until one of the net weight of one of the feeders reaches the RLS weight.

In the example of Table 1, the net weight of material in feeder 84 is equal to the RLS weight of 14 kilograms for that feeder. Ordinarily, feeder 84 would gain access to the vacuum source, but feeder 80 has a higher priority product value than feeder 84 (21 versus 1.5). Thus, instead of starting to refill feeder 84, selecting means 70b selects feeder 80. Because of its high feed rate, feeder 80 will reach its RLS weight within about 8 seconds, which is about 21 seconds before feeder 84 would be completely refilled if feeder 84 were refilled before feeder 80. In the example, the vacuum source is maintained deactuated for 8 seconds, and then feeder 80 is refilled. Only after feeder 80 is refilled may feeder 84 be refilled.

Linear RDV functions are used because they are computationally simple. Given an RLS weight and an RDP weight for each feeder, the entire RDV function 110 may be generated as a first order polynomial, given by equations (1) to (3).

$$RDV = (RDP - \text{Net Weight})/(RDP - RLS) \quad (1)$$

$$\overline{RDV} \min (4, RDV) \quad (2)$$

$$\overline{RDV} \max (0, RDV) \quad (3)$$

Equation (1) defines the RDV curve. Equation (2) limits the RDV to a maximum value of four, so that the priority product value does not become extremely high solely on the basis of the RDV. Equation (3) simply ensures that the RDV is zero for all net weights above the RDP weight. Although only linear RDV functions are shown in FIG. 5, it is contemplated that other monotonically decreasing functions may also be used to relate the Refill Demand Value to the current net weight of the material feeder.

An equivalent RDV function may be implemented by storing a plurality of RDV values in a look-up table and using a conventional interpolation routine to determine individual RDV values.

Figure 6:
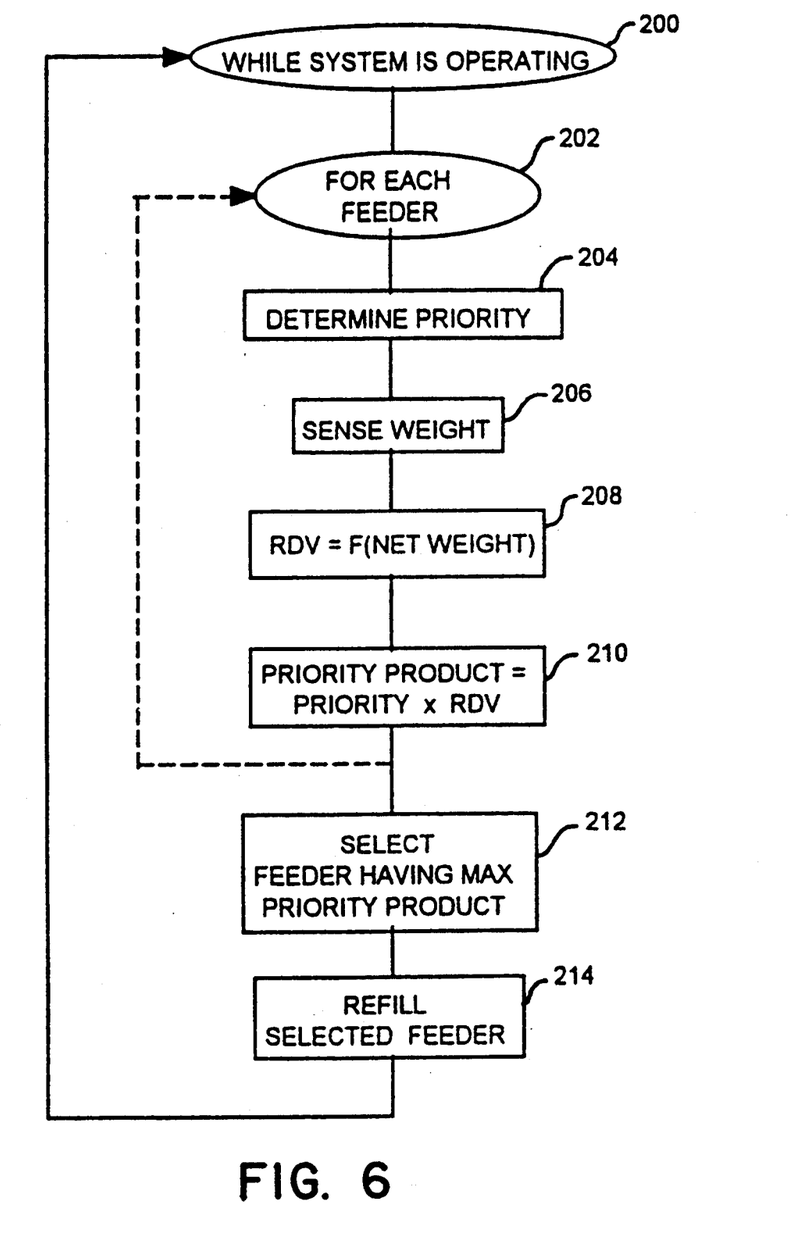
FIG. 6 is a flow chart diagram showing the method for determining the refill priority of each material feeder shown in FIG. 3.

FIG. 6 is a flow chart diagram showing the steps performed by prioritizing means 70a and selecting means 70b.

Steps 200–214 are repeated continuously while the blender system is operating. A loop 202–210 is executed by the prioritizing means 70a for each material feeder 80, 82, 84 and 86 individually.

First, at step 204, a respective priority value is determined for each feeder 80, 82, 84 and 86, based on the number of refills per hour for the feeder, which in turn depends on the current extruder setpoint.

At step 206, the weight of the feeder is sensed using load cells 68 or other sensing means. At step 208, the current RDV value for that feeder is determined. The value may be computed using equations (1) to (3), above. At step 210, the priority product value is computed as the product of the RDV and the priority (refills per unit of time). Steps 204–210 are repeated for each feeder.

When all of the priority product values are computed, control passes to step 212. At step 212, the selecting means 70b selects the feeder having the largest priority product value as the next feeder to be refilled. At step 214, the switching means 88 couples the selected feeder to the vacuum source and the selected feeder is refilled.

Ordinarily, once the refilling of a material feeder begins, the refilling continues until the material in the feeder reaches the first prescribed level (as measured by the weight of the material). However, it is apparent from FIG. 6 that the loop of steps 200–214 executes continuously, even while one of the feeders 80, 82, 84 or 86 is being refilled. Thus the exemplary prioritizing means inherently provides a mechanism for interrupting the refilling of a first feeder to prevent a second feeder from becoming empty while the first feeder is being filled.

This interrupt mechanism includes means for causing the switching means to decouple the vacuum source from the refill hopper of the first feeder and couple the vacuum source to the refill hopper of the second feeder, without waiting for the weight of material in the first feeder to reach the first prescribed weight.

For example, assume that feeder 80 is currently being filled. As feeder 80 is refilled, its RDV is continuously recalculated. When step 208 is executed, the RDV of feeder 80 decreases because the feeder is being refilled. When step 210 is executed, the priority product value of feeder 80 decreases because the RDV decreases. On the other hand, the RDV of feeder 84 (and consequently its priority product value) grows larger each time the loop of steps 200–214 is executed, because feeder 84 is delivering material without being replenished. Eventually, the priority product value of feeder 84 becomes larger than that of feeder 80.

At the instant when the priority product value of feeder 84 becomes larger than that of feeder 80, control block 70 transmits an abort signal to the switching means. The abort signal causes the switching means 88 to decouple the vacuum source from the refill hopper of feeder 80 and to couple the vacuum source to the refill hopper of feeder 84, even though feeder 80 is not completely refilled.

It will be understood by one skilled in the art that the use of the interrupt capability may be limited to conditions in which feeder 84 would become empty before the refilling of feeder 80 completes. If feeder 4 is not in danger of becoming empty, there is no need to interrupt the refilling of feeder 80 at the precise instant that the priority product value of feeder 84 becomes larger than that of feeder 80. Feeder 80 is completely refilled, and then feeder 84 is refilled.

Although it is also contemplated that the interrupt capability may be used regardless of whether any feeder 80, 82, 84 or 86 is imminently in danger of becoming empty, this technique greatly increases the number of times that the switching means 88 switches the vacuum source to another feeder, and may reduce the life of switching means 88.

In an alternative variation of the prioritizing means (described in detail below with reference to FIG. 8), the material feeders may be assigned fixed designations of "high" or "low" priority. In this alternative, the priority product value of a high priority feeder is computed in the manner described above with reference to FIG. 6. The entire group of low priority feeders may be assigned a fixed priority product value, collectively, for the purpose of determining whether to refill a high or low priority feeder next. When a low priority feeder is to be filled, the method of FIG. 6 is used to choose among the low priority feeders.

For purpose of explanation, it is assumed that feeders 80 and 82 belong to a first group having high priority, and feeders 84 and 86 belong to a second group having low priority (as defined below). The high priority feeders 80 and 82 receive preferential access to the vacuum source, even though the low priority feeders 84 and 86 may each be closer to (or possibly below) the second prescribed level at which the low priority feeders are refilled.

Figure 7:
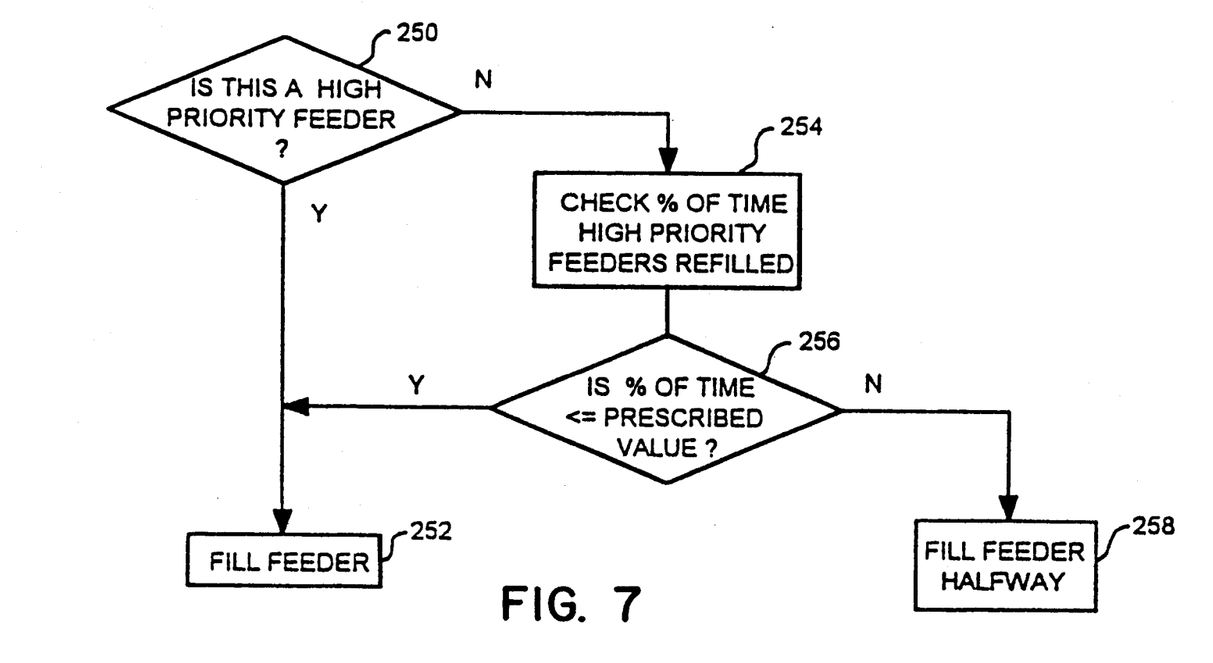
FIG. 7 is a flow chart diagram showing an optional method for boosting the priority of a subset of the material feeders shown in FIG. 3.

FIG. 7 is a flow chart diagram of an optional alternative set of steps that may be used instead of step 214 of FIG. 6, to increase the fraction of the time during which the vacuum source is available for filling the high priority feeders 80 and 82. After the next feeder is selected at step 212, the priority of the feeder is checked at step 250. If the next feeder to be refilled is a high priority feeder, then at step 252, the feeder is completely filled to the weight corresponding to the first prescribed level.

If, however the next feeder to be refilled is a low priority feeder, then at step 254, control block 70 computes the fraction of the time during which the vacuum source is coupled to any of the high priority material feeders 80 or 82. This computation may be made by calculating the fraction of the time in which high priority feeders are refilled during a relatively short period of time, such as the most recent five minutes.

At step 256, if the fraction computed in step 254 does not exceed a predetermined value (e.g.; 0.5 in the exemplary embodiment), then control passes to step 252, and the low priority feeder is completely refilled.

But if, at step 256, the fraction computed in step 254 exceeds the predetermined value (e.g., 0.5), then control passes to step 258, and the low priority feeder is only refilled half way. This reduces the fraction of the time during which the vacuum source is coupled to the low priority feeders, increasing the availability of the vacuum source for the high priority feeders.

In the exemplary embodiments, the prioritizing function 70a and selecting function 70b are implemented in software within a microprocessor, such as a Motorola 68000 series microprocessor. The software may be stored in a conventional storage medium, such as a read-only-memory (ROM). Data pertaining to the characteristics of individual feeders 80, 82, 84 and 86 may be stored in a look up table in conventional storage media, such as a disk. One of ordinary skill in the art of programming for embedded processors could readily develop software to implement the steps shown in FIGS. 6 and 7.

Figure 8:
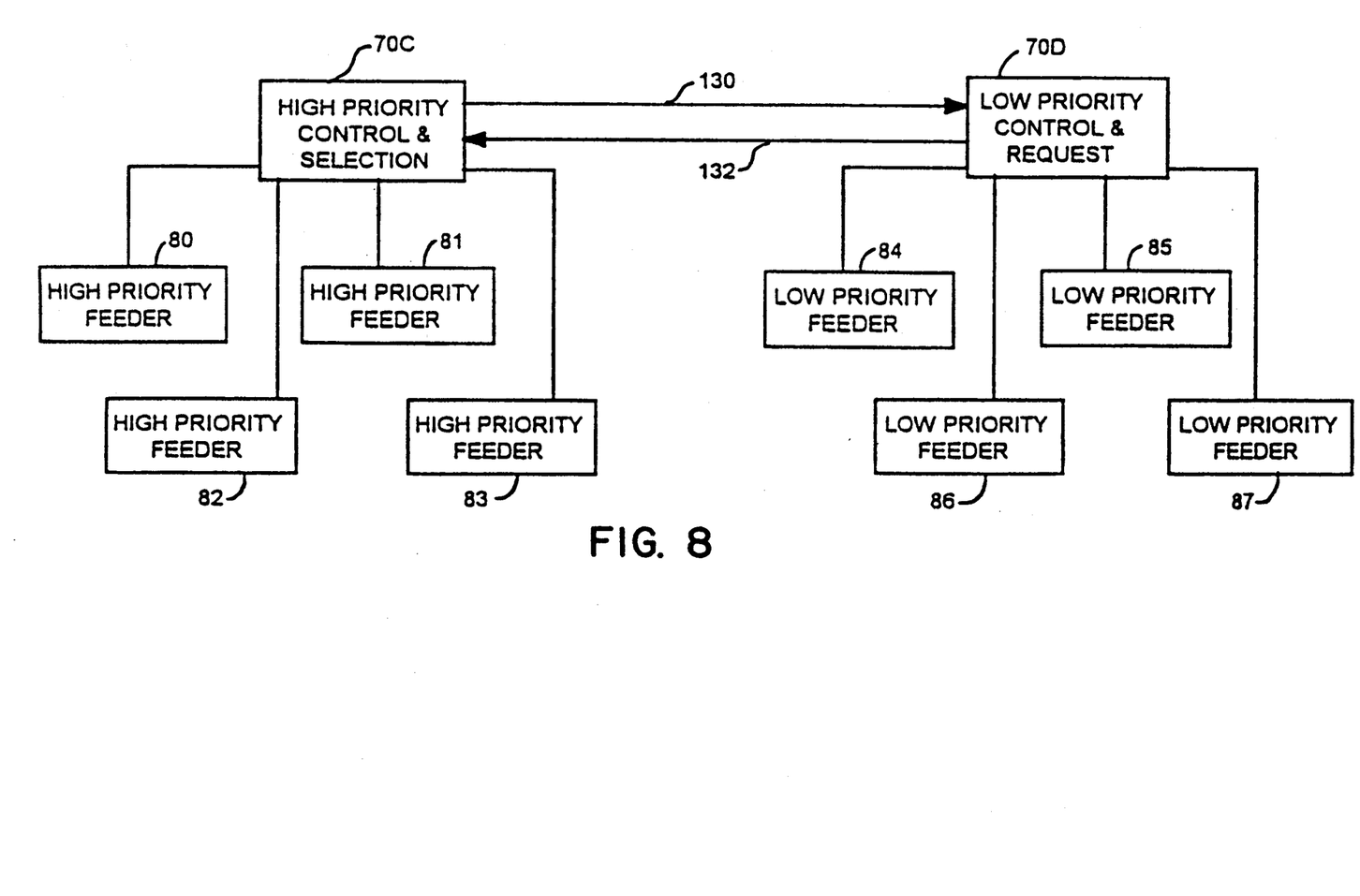
FIG. 8 is a block diagram showing a variation of the control block for accommodating additional material feeders.

FIG. 8 is a block diagram showing a variation of the prioritizing function 70a of control block 70. The control functions and Input/Output (I/O) functions for a group of material feeders 80-83 may be implemented in a single printed circuit board (PCB) 70C, having a single microprocessor (not shown). For ease of manufacture and cost control, the number of feeders controlled by a single circuit board may be limited to a number (for example, four feeders in the exemplary PCB 70C). The number of feeders per printed circuit board is a design choice largely influenced by convenience and market considerations.

In the configuration of FIG. 8, a total of eight material feeders 80-87 are provided. The eight material feeders are all coupled by a pneumatic switch to a single vacuum source (not shown), in a configuration analogous to that shown in FIG. 3. Because the exemplary PCB 70C controls only four feeders 80-83, it is desirable to provide a simple mechanism by which the prioritization operations of a second PCB 70D may be coordinated with the operations of PCB 70C.

The two PCBs 70C and 70D are designated the high priority PCB and low priority PCB, respectively. The low priority PCB 70D transmits refill request signals 132 to the high priority PCB 70C. PCB 70C evaluates the refill request signals and the priority product values of the high priority feeders 80-83, and determines whether the priority product value of any of the high priority feeders 80-83 is sufficiently high that the request should not be granted.

If the request is not granted, then the high priority feeder 80-83 having the highest priority product value is selected as the next feeder to access the vacuum source. PCB 70C then applies the vacuum source to the next high priority feeder 80-83 in accordance with the method described above with reference to FIG. 6. In this case, the low priority PCB 70D continues to transmit the refill request signals 132 until the request is granted.

If, however, the request is granted, then high priority PCB 70C transmits a request grant signal 130 to low priority PCB 70D. Once it receives the grant signal 130, low priority PCB 70D selects the low priority feeder 84-87 having the highest priority product value according to the method of FIG. 6, and the selected feeder is refilled. Optionally, the selected feeder may be partially filled, as described above with reference to FIG. 7. Once the selected low priority feeder is refilled, low priority PCB 70D notifies high priority PCB 70C that the refill operation is complete, thereby relinquishing access to the vacuum source. In the embodiment of FIG. 8, the refill request signals 132 and the refill grant signals 130 are one bit signals having two states. For example, the first state may be logic-low and the second state may be logic-high. For convenience, the description below equates the first state with logic-low and the second state with logic-high. It is understood that equivalent systems may use logic-high as the first state and logic-low as the second state. Table 2 summarizes the states and their effects.

TABLE 2

| Request 132 logic-low | Request 132 logic-high |
|---|---|
| Grant 130 logic low | |
| Refill high priority feeder, no low priority feeder in need of refill | Refill high priority feeder, low priority PCB waiting for high priority PCB to relinquish control |
| Grant 130 logic-high | |
| Low priority feeder has completed refill; Low priority PCB is relinquishing control | Request granted; Refill low priority feeder, high priority PCB waiting for low priority PCB to relinquish control |

The sequence of states proceeds in a clockwise manner. With both the request and grant signals 132 and 130 logic-low, the high priority material feeders 80-83 have access to the vacuum source, and there are no low priority feeders 84-87 in need of refilling. When one of the low priority feeders 84-87 needs refilling, low priority PCB 70D changes the state of Request signal 132 to logic-high, notifying high priority PCB 70C that the vacuum resource is requested by PCB 70D.

Both signals remain unchanged until high priority PCB 70C determines that none of the high priority feeders 80-83 currently require refilling (i.e., when all of the high priority feeders have a net weight greater than the RDP weight). In a variation of this method, the high priority PCB may grant access if the priority product values of all of the high priority feeders 80-83 are below a low, predetermined threshold value (e.g., one).

When the high priority PCB 70C determines that the request should be granted, it changes the state of the Grant signal 130 to logic-high. This relinquishes control over access to the vacuum source to the low priority PCB 70D. Low priority PCB 70D is now free to select the low priority feeder in greatest need of a refill, according to the method of FIG. 6. High priority PCB 70C monitors the state of the refill request signal 132 and waits until control is relinquished by low priority PCB 70D. When one of the low priority feeders 84-87 has been refilled, the low priority PCB 70D changes the state of the Request signal back to logic-low, indicating that the refill operation has been completed.

The low priority PCB 70D is only permitted to refill one feeder 84, 85, 86 or 87 before returning the Request signal to logic-low. If there is a second low priority feeder 84-87 requiring a refill, low priority PCB 70D must wait until high priority PCB 70C acknowledges that low priority PCB 70D has relinquished access to the vacuum source, before low priority PCB 70D may again request access by changing the state of the Request signal to logic-high.

When the low priority PCB 70D relinquishes control (by changing the state of Request signal 132 logic-low), high priority PCB 70C acknowledges this by changing the state of the grant signal to logic-low. The system is now returned to the original state, in which the high priority PCB 70C controls all access to the vacuum source.

It is understood by one of ordinary skill in the art of control systems that the actual priority product values of the low priority feeders 84-87 may be provided to the high priority PCB 70C for the purpose of selecting the next feeder to be refilled. This requires that the request signal 132 include more than one bit of information, which increases the cost and complexity of the implementation. However, using the actual priority product values of the low priority feeders 84–87 is more reliable in terms of preventing any of the (high or low priority) feeders 80–87 from becoming empty.

One of ordinary skill understands that the exemplary prioritizing mechanism described herein may be replaced by a variety of equivalent structures. For example, the exemplary RDV function and priority product value increase as a feeder becomes empty, and the feeder having the highest priority product value is refilled first. An equivalent prioritizing means (not shown) uses a priority product value function that decreases when the feeder becomes empty; the feeder having the lowest priority product value would then be refilled first.

Although the prioritizing means 70a and selecting means 70b have been described with reference to their use in conjunction with the material feeding apparatus shown in FIG. 2, one of ordinary skill in the art will understand that the control methods and apparatus shown in FIGS. 5–8 may also be used in conjunction with other types of material feeders. It is contemplated that the prioritizing means and selecting means may also be used in other blender systems (not shown) in which each material feeder includes a refill hopper sealingly coupled to a feeder hopper, even though the refill hopper and feeder hopper may not be contained within a single housing. A valve, which may be similar to valve 55, is coupled between the outlet of the refill hopper and the inlet of the feeder hopper. The valve is movable between a completely closed position at which material in the refill hopper is prevented from discharging into the feeder hopper, and an open position at which material in the refill hopper is permitted to discharge into the feeder hopper.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. Material feeding apparatus for delivering material from a storage container to utilization equipment, said apparatus comprising:
    a vertically disposed housing having:
        (a) a divider wall extending across said housing to define a feeder hopper portion below said divider wall and a refill hopper portion above said divider wall, and
        (b) an outlet at the bottom of said feeder hopper portion of said housing;
    a vacuum source for drawing material from the storage container to said refill hopper portion of said housing;
    a valve in said divider wall of said housing and movable between:
        (a) a completely closed position at which material in said refill hopper portion of said housing is prevented from discharging into said feeder hopper portion of said housing; and
        (b) an open position at which material in said refill hopper portion of said housing is permitted to discharge into said feeder hopper portion of said housing;
    a feed unit positioned below said outlet at the bottom of said feeder hopper portion of said housing for delivering material to the utilization equipment;
    sensing means for:
        (a) indicating when the level of material in said refill hopper portion of said housing is at least as high as a first prescribed level,
        (b) indicating when the level of material in said feeder hopper portion of said housing is at least as low as a second prescribed level, and
        (c) sensing the weight of the material in said housing; and
    control means responsive to said sensing means for:
        (a) maintaining said vacuum source deactuated:
            (1) when the level of the material in said refill hopper portion of said housing is at least as high as said first prescribed level, and
            (2) when the level of material in said feeder hopper portion of said housing is above said second prescribed level,
        (b) maintaining said vacuum source actuated:
            (1) when the level of the material in said refill hopper portion of said housing is below said first prescribed level, and
            (2) when the level of material in said feeder hopper portion of said housing is at least as low as said second prescribed level, and
        (c) controlling the speed of said feed screw unit to:
            (1) vary the speed of said feed screw unit while the level of material in said feeder hopper portion of said housing is above said second prescribed level, and
            (2) maintain the speed of said feed screw unit constant while the level of material in said refill hopper portion of said housing is below said first prescribed level and the level of material in said feeder hopper portion of said housing is at least as low said second prescribed level.

2. Material feeding apparatus according to claim 1 wherein said refill hopper portion of said housing and said feeder hopper portion of said housing each have a generally conical shape with the point end of the cone downward.

3. Material feeding apparatus according to claim 2 wherein said valve is a flap valve.

4. Material feeding apparatus according to claim 3 further including means for urging said flap valve to said closed position.

5. Material feeding apparatus according to claim 4 wherein said flap valve is responsive to said vacuum source when said vacuum source is actuated for maintaining said flap valve in said completely closed position while said vacuum source is maintained actuated.

6. Material feeding apparatus according to claim 5 wherein:
    (a) said sensing means include a plurality of weight sensors for developing:
        (1) a first weight indication of the total weight of said housing when the level of material in said refill hopper portion of said housing is at least as high as a first prescribed level, and
        (2) a second weight indication of the total weight of said housing when the level of material in said feeder hopper portion of said housing is at least as low as a second prescribed level, and
    (b) said control means include means for:

(1) storing a first predetermined total weight value representative of the total weight of said housing when the level of material in said refill hopper portion of said housing is at least as high as said first prescribed level, and (2) storing a second predetermined total weight value representative of the total weight of said housing when the level of material in said feeder hopper portion of said housing is at least as low as said second prescribed level, and (3) comparing:
(i) said stored first predetermined total weight value with said first weight indication, and
(ii) said stored second predetermined total weight value with said second weight indication.

7. Material feeding apparatus according to claim 5 wherein:
(a) said sensing means include:
(1) a first level sensor for indicating when the level of material in said refill hopper portion of said housing is at least as high as a first prescribed level,
(2) a second level sensor for indicating when the level of material in said feeder hopper portion of said housing is at least as low as a second prescribed level, and
(3) a weight sensor for sensing the weight of the material in said housing, and
(b) said control means:
(1) maintain said vacuum source deactuated in response to:
(i) said first level sensor when the level of the material in said refill hopper portion of said housing is at least as high as said first prescribed level, and
(ii) said second level sensor when the level of material in said feeder hopper portion of said housing is above said second prescribed level,
(2) maintain said vacuum source actuated in response to:
(i) said first level sensor when the level of the material in said refill hopper portion of said housing is below said first prescribed level, and
(ii) said second level sensor when the level of material in said feeder hopper portion of said housing is at least as low as said second prescribed level, and
(3) control the speed of said feed screw unit to:
(i) vary the speed of said feed screw unit in response to:
said weight sensor, and
said second level sensor while the level of material in said feeder hopper portion of said housing is above said second prescribed level, and
(ii) maintain the speed of said feed screw unit constant in response to:
said first level sensor while the level of material in said refill hopper portion of said housing is below said first prescribed level, and
said second level sensor while the level of material in said feeder hopper portion of said housing is at least as low as said second prescribed level.

8. Material feeding apparatus according to claim 7 wherein said second level sensor includes:

(a) said flap valve and said flap valve has a size and range of movement which permits said flap valve to move from said open position of said flap valve to said completely closed position of said flap valve when the level of material in said feeder hopper portion of said housing is at least as low as said second prescribed level, and
(b) a sensor responsive to movement of said flap valve to indicate whether said flap valve is open or completely closed.

9. Material feeding apparatus for delivering material from a storage container to utilization equipment, said apparatus comprising:
a feeder hopper having an outlet at the bottom thereof;
a refill hopper positioned above said feeder hopper and having a discharge opening at the bottom thereof through which material in said refill hopper can discharge to said feeder hopper;
a vacuum source for drawing material from the storage container to said refill hopper;
first sensing means for indicating when the level of material in said refill hopper is at least as high as a first prescribed level;
a flap valve in said discharge opening at the bottom of said refill hopper and
(a) movable:
(1) from and to a completely closed position at which material in said refill hopper is prevented from discharging into said feeder hopper, and
(2) over a range of open positions at which material in said refill hopper is permitted to discharge into said feeder hopper, said range of open positions including a completely open position at which said flap valve extends into said feeder hopper, and
(b) having a size and range of movement which permits said flap valve to move from said completely open position of said flap valve to said completely closed position of said flap valve when the level of material in said feeder hopper is at least as low as a second prescribed level;
second sensing means for indicating whether said flap valve is in its completely closed position or within said range of open positions;
third sensing means for sensing the weight of the material in said housing;
a feed unit positioned below said outlet at the bottom of said feeder hopper for delivering material to the utilization equipment;
and control means for:
(a) deactuating said vacuum source in response to:
(1) said first sensing means when the level of the material in said refill hopper is at least as high as said first prescribed level, and
(2) said second sensing means when said flap valve is open within said range of open positions,
(b) actuating said vacuum source in response to:
(1) said first sensing means when the level of the material in said refill hopper is below said first prescribed level, and
(2) said second sensing means when said flap valve is at its completely closed position, and
(c) controlling the speed of said feed screw unit to:
(1) vary the speed of said feed screw unit in response to:

(i) said third sensing means, and (ii) said second sensing means while said flap valve is within said range of open positions, and (2) maintain the speed of said feed screw unit constant in response to:

(i) said first sensing means while the level of material in said refill hopper is below said first prescribed level, and (ii) said second sensing means while said flap valve is at its completely closed position.

10. Material feeding apparatus according to claim 9 wherein said refill hopper and said feeder hopper each have a generally conical shape with the point end of the cone downward.

11. Material feeding apparatus according to claim 10 wherein said flap valve is responsive to said vacuum source when said vacuum source is actuated for maintaining said flap valve in said completely closed position.

12. A material blender system comprising:

a plurality of material feeders each having:

(a) a vertically disposed housing having:

(1) a divider wall extending across said housing to define a feeder hopper portion below said divider wall and a refill hopper portion above said divider wall, and (2) an outlet at the bottom of said feeder hopper portion of said housing, (b) vacuum means for drawing material from a storage container to said refill hopper portion of said housing, (c) a valve in said divider wall of said housing and movable between:

(1) a completely closed position at which material in said refill hopper portion of said housing is prevented from discharging into said feeder hopper portion of said housing, and (2) an open position at which material in said refill hopper portion of said housing is permitted to discharge into said feeder hopper portion of said housing, (d) a feed unit positioned below said outlet at the bottom of said feeder hopper portion of said housing for delivering material to utilization equipment, (e) sensing means for:

(1) indicating when the level of material in said refill hopper portion of said housing is at least as high as a first prescribed level, (2) indicating when the level of material in said feeder hopper portion of said housing is at least as low as a second prescribed level, and (3) sensing the weight of the material in said housing, and (f) control means responsive to said sensing means for:

(1) maintaining said vacuum means deactuated:

(i) when the level of the material in said refill hopper portion of said housing is at least as high as said first prescribed level, and (ii) when the level of material in said feeder hopper portion of said housing is above said second prescribed level, (2) maintaining said vacuum means actuated:

(i) when the level of the material in said refill hopper portion of said housing is below said first prescribed level, and (ii) when the level of material in said feeder hopper portion of said housing is at least as low said second prescribed level, and (3) controlling the speed of said feed unit to:

(i) vary the speed of said feed unit while the level of material in said feeder hopper portion of said housing is above said second prescribed level, and (ii) maintain the speed of said feed unit constant while the level of material in said refill hopper portion of said housing is below said first prescribed level and the level of material in said feeder hopper portion of said housing is at least as low as said second prescribed level;

and a collection hopper positioned to receive material from said feed units of said material feeders.

13. A material blender system according to claim 12 wherein said refill hopper portions of said housings and said feed hopper portions of said housings each have a generally conical shape with the point end of the cone downward.

14. A material blender system according to claim 13 wherein each of said valves in said material feeders is a flap valve.

15. A material blender system according to claim 14 wherein each of said material feeders further includes means for urging said flap valves to said closed position.

16. A material blender system according to claim 15 wherein each of said flap valves of said material feeders is responsive to said vacuum means when said vacuum means is actuated for maintaining said flap valve in said completely closed position while said vacuum means is maintained actuated.

17. A material blender system according to claim 16 wherein:

(a) each of said sensing means of said material feeders includes a plurality of weight sensors for developing:

(1) a first weight indication of the total weight of said housing when the level of material in said refill hopper portion of said housing is at least as high as a first prescribed level, and (2) a second weight indication of the total weight of said housing when the level of material in said feeder hopper portion of said housing is at least as low as a second prescribed level, and (b) each of said control means of said material feeders include means for:

(1) storing a first predetermined total weight value representative of the total weight of said housing when the level of material in said refill hopper portion of said housing is at least as high as said first prescribed level, and (2) storing a second predetermined total weight value representative of the total weight of said housing when the level of material in said feeder hopper portion of said housing is at least as low as said second prescribed level, and (3) comparing:

(i) said stored first predetermined total weight value with said first weight indication, and (ii) said stored second predetermined total weight value with said second weight indication.

18. A material blender system comprising:

a plurality of material feeders each having:

(a) a feeder hopper having an outlet at the bottom thereof, (b) a refill hopper positioned above said feeder hopper and having a discharge opening at the bottom thereof through which material in said refill hopper can discharge to said feeder hopper, (c) vacuum means for drawing material from a storage container to said refill hopper, (d) first sensing means for indicating when the level of material in said refill hopper is at least as high as a first prescribed level, (e) a flap valve in said discharge opening at the bottom of said refill hopper and
  (1) movable:
    (i) from and to a completely closed position at which material in said refill hopper is prevented from discharging into said feeder hopper, and
    (ii) over a range of open positions at which material in said refill hopper is permitted to discharge into said feeder hopper, said range of open positions including a completely open position at which said flap valve extends into said feeder hopper, and
  (2) having a size and range of movement which permits said flap valve to move from said completely open position of said flap valve to said completely closed position of said flap valve when the level of material in said feeder hopper is at least as low as a second prescribed level, (f) second sensing means for indicating whether said flap valve is at its completely closed position or within said range of open positions, (g) third sensing means for sensing the weight of the material in said housing, (h) a feed unit positioned below said outlet at the bottom of said feeder hopper for delivering material to utilization equipment, and (i) control means for:
  (1) deactuating said vacuum means in response to:
    (i) said first sensing means when the level of the material in said refill hopper is at least as high as said first prescribed level, and
    (ii) said second sensing means when said flap valve is open within said range of open positions,
  (2) actuating said vacuum means in response to:
    (i) said first sensing means when the level of the material in said refill hopper is below said first prescribed level, and
    (ii) said second sensing means when said flap valve is at its completely closed position, and
  (3) controlling the speed of said feed unit to:
    (i) vary the speed of said feed unit in response to:
      said third sensing means, and
      said second sensing means while said flap valve is within said range of open position, and
    (ii) maintain the speed of said feed unit constant in response to:
      said first sensing means while the level of material in said refill hopper is below said first prescribed level, and
      said second sensing means while said flap valve is at its completely closed position;
and a collection hopper positioned to receive material from said feed units of said material feeders.

19. A material blender system according to claim 18 wherein each of said refill hoppers of said material feeders and each of said feeder hoppers of said material feeders have a generally conical shape with the point end of the cone downward.

20. A material blender system according to claim 19 wherein each of said second sensing means of said material feeders includes a sensor responsive to movement of said flap valves to indicate whether said flap valves are open or completely closed.

21. A material blender system according to claim 20 wherein each of said material feeders further includes means for urging said flap valves to said closed position.

22. A material blender system according to claim 21 wherein each of said flap valves in said material feeders is responsive to said vacuum means in said material feeders when said vacuum means are actuated for maintaining said flap valves in said completely closed position while said vacuum means are maintained actuated.

23. A material blender system comprising:
  a plurality of material feeders each having:
    (a) a refill hopper having an outlet at a bottom thereof,
    (b) a feeder hopper below said refill hopper and having an inlet at a top thereof and an outlet at a bottom thereof,
    (c) a valve coupled between said outlet of the refill hopper and said inlet of the feeder hopper and movable between:
      (1) a completely closed position at which material in said refill hopper is prevented from discharging into said feeder hopper, and
      (2) an open position at which material in said refill hopper is permitted to discharge into said feeder hopper,
    (d) means for sensing the weight of the material in said material feeder, and
    (e) a feed unit positioned below said outlet of said feeder hopper for delivering material;
  a collection hopper positioned to receive material from said feed unit of each of said material feeders;
  a vacuum source for drawing material from a storage container;
  switching means for successively coupling said vacuum source to said refill hoppers individually to provide the drawn material to said refill hoppers; and
  control means responsive to said sensing means, including:
    (a) deactuating means for maintaining said vacuum source deactuated when the weight of the material in each one of said material feeders is at least as high as a first prescribed weight,
    (b) actuating means for maintaining said vacuum source actuated when the weight of material in at least one of said material feeders is at least as low as a second prescribed weight, and
    (c) prioritizing means for:
      (1) dynamically determining which one of said material feeders first becomes empty if not refilled, and
      (2) selecting said one material feeder as the material feeder for which the respective refill hopper thereof is coupled to said vacuum source next by the switching means.

24. A material blender system according to claim 23, wherein said control means further include:
(d) means for causing said switching means to decouple said vacuum source from the refill hopper of a first one of the material feeders and couple said vacuum source to the refill hopper of a second one of the material feeders, without waiting for the weight of material in said first material feeder to reach the first prescribed weight.

25. A material blender system according to claim 24, wherein:
(1) said prioritizing means include:
(a) means for calculating a first period of time during which said first material feeder delivers material without becoming empty if said switching means decouples said vacuum source from the refill hopper of said first material feeder,
(b) means for calculating a second period of time during which a second one of said material feeders delivers material without becoming empty, and
(c) means for generating and transmitting an abort signal to the switching means if the first period of time is greater than the second period of time; and
(2) said switching means is responsive to the abort signal for decoupling said vacuum source from the refill hopper of said first material feeder and for coupling said vacuum source to the refill hopper of said second material feeder.

26. A material blender system according to claim 23 wherein said prioritizing means include means for determining said one material feeder based on an expected number of times that the refill hopper of each material feeder is refilled within a prescribed unit of time.

27. A material blender system according to claim 26 wherein:
(1) the prioritizing means calculates a respective priority product value of each material feeder as the product of the expected number multiplied by a function of the net weight of material in that feeder, and
(2) the prioritizing means selects the material feeder having the highest priority product value.

28. A material blender system according to claim 27 wherein the function of the net weight for each material feeder decreases linearly as the net weight of material in that material feeder increases.

29. A material blender system according to claim 23 wherein said prioritizing means include:
(1) means for dynamically assigning a respectively different priority product value to each material feeder based on the current weight of material in each respective material feeder, and
(2) means for selecting the one of said material feeders that has the highest priority product value as said one material feeder next coupled to the vacuum source.

30. A material blender system according to claim 23 wherein each material feeder has an adjustable mass flow rate setpoint, and said prioritizing means include:
(1) means for dynamically assigning a respectively different priority product value to each material feeder based on the current mass flow rate setpoint of each respective material feeder, and
(2) means for selecting the one of said material feeders that has the highest priority product value as said one material feeder next coupled to the vacuum source.

31. A material blender system according to claim 23 wherein each material feeder has an adjustable mass flow rate setpoint, and said prioritizing means include:
(1) means for dynamically assigning a respectively different priority product value to each material feeder based on:
(a) a first factor that varies with the mass flow rate setpoint of each material feeder, and
(b) a second factor that depends on the current weight of material in each material feeder,
said priority product value being the arithmetic product of said first and second factors, and
(2) means for selecting the one of said material feeders that has the highest priority product value as said one material feeder next coupled to the vacuum source.

32. A material blender system according to claim 31 wherein:
(1) said prioritizing means include means for transmitting an abort signal to said switching means if the priority product value of a first one of said material feeders becomes lower than the priority product value of a second one of said material feeders while the refill hopper of said first material feeder is being refilled, and
(2) said switching means is responsive to the abort signal for decoupling said vacuum source from the refill hopper of said first material feeder and for coupling said vacuum source to the refill hopper of said second material feeder before the weight of material in said first material feeder reaches the first prescribed weight.

33. A material blender system according to claim 23 wherein:
(a) said valve in each material feeder is a flap valve having a size and range of movement which permits said flap valve to move from said open position of said flap valve to said completely closed position of said flap valve when the weight of material in said material feeder is at least as low as said second prescribed weight, and
(b) said sensing means in each material feeder include a sensor responsive to movement of said flap valve to indicate whether said flap valve is open or completely closed.

34. A material blender system according to claim 33 wherein said flap valve in each respective material feeder is responsive to said vacuum source for maintaining said flap valve in said completely closed position while:
(a) said vacuum source is actuated, and
(b) said switching means couples said refill hopper of the respective material feeder to said vacuum source.

35. A material blender system according to claim 23 wherein the refill hopper and feeder hopper of each respective material feeder are included within a single vertically disposed housing.

36. A material blender system according to claim 35 wherein the housing includes a divider wall extending across said housing to define a portion below said divider wall as said feeder hopper and a portion above said divider wall as said refill hopper.

37. A material blender system according to claim 36 wherein said refill hopper and said feeder hopper each have a generally conical shape with the point end of the cone downward.

* * * * *